United States Patent
Tavlykaev et al.

(10) Patent No.: US 6,795,620 B2
(45) Date of Patent: Sep. 21, 2004

(54) FIBER TAIL ASSEMBLY WITH OPTICAL SIGNAL TAP

(75) Inventors: Robert Tavlykaev, Ellicott City, MD (US); Alan Donaldson, Clarksville, MD (US)

(73) Assignee: Codeon Corporation, Columbia, MD (US)

( * ) Notice: Subject to any disclaimer, the term of this patent is extended or adjusted under 35 U.S.C. 154(b) by 100 days.

(21) Appl. No.: 10/304,699

(22) Filed: Nov. 27, 2002

(65) Prior Publication Data

US 2004/0101248 A1 May 27, 2004

(51) Int. Cl.[7] ................................................ G02B 6/42
(52) U.S. Cl. ........................................................ 385/48
(58) Field of Search ............................................ 385/48

(56) References Cited

U.S. PATENT DOCUMENTS

| | | | |
|---|---|---|---|
| 4,165,496 A | 8/1979 | Di Domenico, Jr. et al. | 331/94.5 |
| 5,259,044 A | 11/1993 | Isono et al. | 385/2 |
| 5,369,719 A | 11/1994 | Mishima et al. | 385/48 |
| 5,764,400 A | 6/1998 | Itou et al. | 359/245 |
| 5,832,156 A | 11/1998 | Strasser et al. | 385/48 |
| 5,963,357 A | 10/1999 | Kubota et al. | 359/239 |
| 6,122,422 A | 9/2000 | Koeppen et al. | 385/48 |
| 6,124,956 A | 9/2000 | Severn | 359/110 |
| 6,249,626 B1 | 6/2001 | Bergmann | 385/48 |
| 6,421,483 B1 * | 7/2002 | Hajjar | 385/48 |

FOREIGN PATENT DOCUMENTS

JP    WO 01/69308 A1    9/2001    ........... G02F/1/035

OTHER PUBLICATIONS

Norikazu Miyazaki, Kazuhito Ooizumi, Tokutaka Hara, Manabu Yamada, Hirotoshi Nagata, and Toshio Sakane, "LiNbO$_3$ Optical Intensity Modulator Packaged with Monitor Photodiode", *IEEE Photonics Technology Letters*, vol. 13, No. 5 (May 2001), pp. 442–444.

\* cited by examiner

*Primary Examiner*—Mark Tremblay
(74) *Attorney, Agent, or Firm*—Morgan Lewis & Bockius LLP (57) ABSTRACT

A method and optical tap is provided for forming a monitor signal that is a measure of optical power in a guided mode output of an optical modulator. The method and optical tap may monitor the guided mode power without tapping the guided mode light, even when optical power of the radiation modes is non-complementary to that of the output mode. Light from the radiation modes of the optical modulator is coupled into the wall of a capillary through a front face. Separate portions of the radiation mode light are reflected into photodetectors, which form photocurrents that are incoherently added to form the monitor signal.

27 Claims, 9 Drawing Sheets

FIBER TAIL ASSEMBLY WITH OPTICAL SIGNAL TAP

BACKGROUND OF THE INVENTION

The present invention relates to monitoring the operation of an optical modulator, and more particularly to methods and devices for tapping light from radiation modes of the optical modulator for monitoring the optical power in a guided mode without tapping light from the guided mode. Although the present invention is suitable for a wide scope of applications, it is particularly suitable for tapping monitor light for controlling the bias of an optical modulator.

An integrated optical modulator is of great importance for operating a fiber optical communication system, especially for operating in the range of 2.5 to 40 Gbps (gigabits per second). An optical data signal may be generated by directly modulating an optical source, such as a semiconductor laser, through modulation of the laser's electrical drive-current. However, high-speed direct modulation can induce wavelength fluctuation (chirp) in the optical signal, which can lead to wavelength dispersion in an optical fiber and degrade signal transmission.

Figure 1:
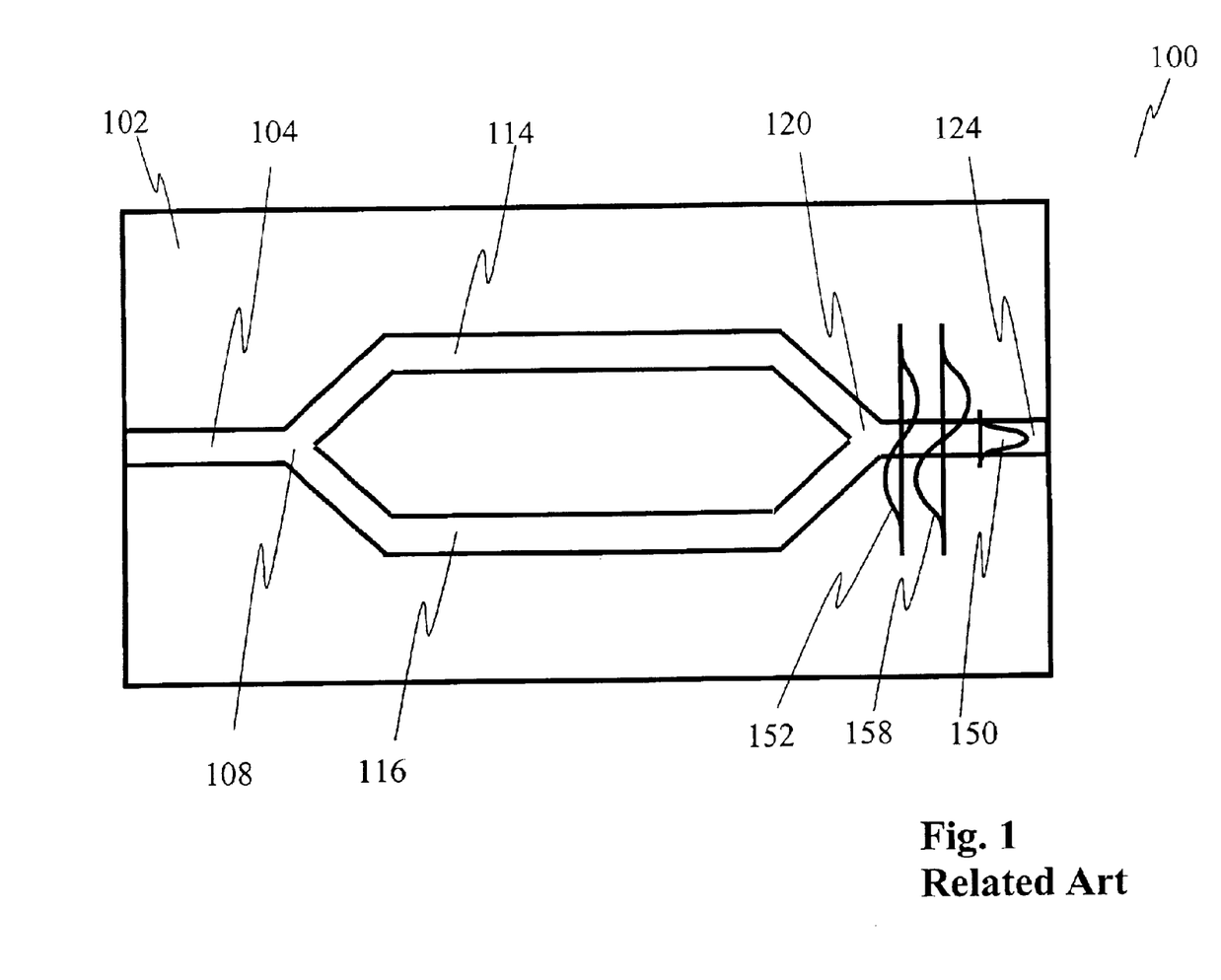
FIG. 1 shows a Mach-Zehnder type (MZI) optical modulator that is related art.

Alternatively, an optical signal with significantly reduced chirp or with well controlled chirp can be generated by using a continuous-wave optical source that is externally modulated. For example, an external modulator may be a Mach-Zehnder type modulator 100, as shown in FIG. 1. Modulator 100 has an input waveguide 104, a splitting branch 108, two modulation waveguides 114 and 116, a recombination branch 120, and an output waveguide 124, all on a substrate 102. The waveguides may be formed in substrate 102 in any way, such as by selectively diffusing a metal, such as titanium (Ti), into the substrate to form a waveguide that has a higher refractive index than the surrounding material. In this case, the surrounding material acts as a lower-index medium, and light is guided to propagate along the higher-index waveguide. Alternatively, additional material layers may be deposited onto substrate 102 to act as cladding material or waveguide material.

In this example, a light source, such as a semiconductor laser diode that is not shown, provides continuous-wave light to input waveguide 104. The source light may be distributed by splitting branch 108 into two separate light fields that propagate through modulation waveguides 114 and 116 respectively, where each is individually phase modulated. The light fields are added by recombination branch 120 into output waveguide 124, and the amount of light that enters output waveguide 124 depends on the optical phase difference between the light fields from modulation waveguides 114 and 116.

More specifically, if the light fields are in phase, with zero phase difference, then all of the light may recombine into a propagating guided mode 150 that travels along output waveguide 124. Alternatively, if the light fields are out of phase, with 180 degree phase difference, then all of the light may recombine into a primary radiation mode 152. As shown in FIG. 1, primary radiation mode 152 may be anti-symmetric, with a field profile that has two lobes that are 180 degrees out of phase from each other. Primary radiation mode 152 is not guided by output waveguide 124 and may travel and diffractively spread in substrate 102. As a further alternative, if the phase difference is an intermediate value, then all of the light may be distributed between guided mode 150 and primary radiation mode 152. When the phase difference changes, the optical powers in guided mode 150 and primary radiation mode 152 vary accordingly, in a manner complementary to each other.

The phase difference depends on the optical phase of the light from each modulation waveguide 114 and 116, which in turn depends on the refractive index of each waveguide's material. For example, the material of substrate 102 may be lithium niobate (LiNbO$_3$) that has an electrooptic effect, and the refractive index of waveguides 114 and 116 may be electrically modulated. Modulation may be done through any type of electrode, such as a travelling-wave electrode that accommodates broadband modulation signals.

As described above, modulating the phase difference results in modulating the optical power in guided mode 150. The phase difference may be modulated about a bias point, which depends on modulation voltages applied, the wavelength of the source light, and the temperature and mechanical stress of the modulator. The bias point may drift over time, degrading the extinction ratio of modulator 100. However, the bias may be controlled through monitoring the modulator output power.

Figure 2:
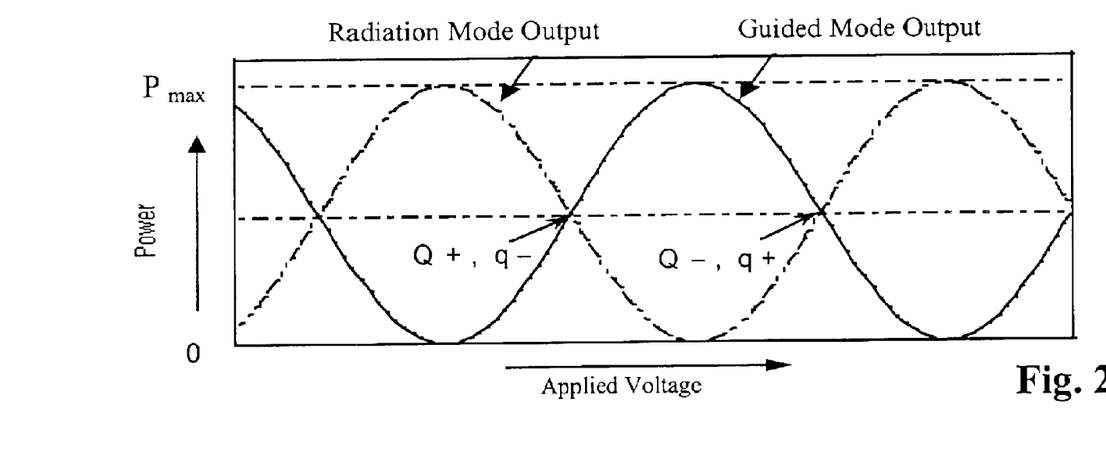
FIG. 2 shows a graph of optical powers in the guided mode and the radiation mode of an exemplary, ideal MZI modulator.

In an ideal modulator, the output power may be monitored by monitoring any portion of primary radiation mode 152. This is because light traveling through the modulator experiences no optical loss or scattering, and the optical power in guided mode 150 and that in primary radiation mode 152 are complementary. The modulation-responses of the two modes are in counter-phase, as shown in FIG. 2. Modulation quadrature points Q, of guided mode 150, and q, of primary radiation mode 152, occur at the same quadrature voltages. Furthermore, any portion of primary radiation mode 152 may be sampled, and the sample signal is complementary to the output power, with any necessary amplitude scaling applied.

Figure 3:
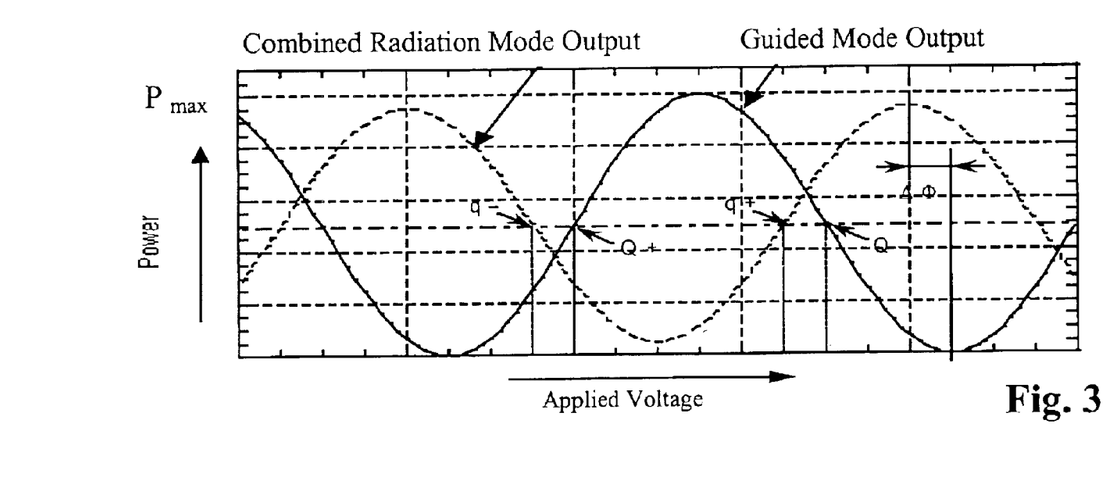
FIG. 3 shows a graph of optical powers in the guided mode and the radiation modes of an exemplary, practical MZI modulator.

However, in a practical modulator, complementarity of any one portion of primary radiation mode 152 may be destroyed. A variety of secondary radiation modes may be produced that combine with the primary radiation mode 152 to form a combined radiation field 158. Combined radiation field 158 and guided mode 150 may be different in amplitude, phase, and quadrature voltages, as shown in FIG. 3. Furthermore, the differences may vary with time. Therefore, merely monitoring part of combined radiation field 158 may not be sufficient to monitor the power of guided mode 150.

Secondary radiation modes may be caused by partial scattering of light traveling in the waveguides. Such scattering may include propagation scattering, splitting/bending scattering, and coupling scattering. Propagation scattering may be caused by the roughness of a waveguide/cladding boundary. For example, part of the light that propagates through waveguides 104, 114, 116 or 124 may be continuously scattered into substrate 102. Splitting/bending scattering occurs wherever there is a bend in a waveguide or a change in waveguide cross-section, such as at splitting branch 108 or at each bend of waveguides 114 and 116. Coupling scattering occurs when light is coupled from one waveguide into another, such as occurs in coupling from an output waveguide into an output optical fiber.

Some secondary radiation modes are modulated and some are not. For example, a secondary radiation mode generated at splitting branch 108 is not modulated, because the scattering occurs before the modulation waveguides 114 and 116. In contrast, light scattered subsequent to the modulation waveguides may be modulated. The radiation modes are not confined to the waveguides and propagate through the substrate. At the output face of modulator 100, the secondary radiation modes spatially overlap with primary radiation mode 152, and all modes add to create the combined radiation field 158. However within the combined field, only the two-lobed field of primary radiation mode 152 is complementary to guided mode 150. Optical interference among the primary and secondary radiation modes can significantly distort combined radiation field 158 and destroy its complementarity to guided mode 150.

As an example, combined radiation field 158 may be sampled by a photodetector across one lobe of the field profile and compared with guided mode 150. The power of guided mode 150 is proportional to $\cos^2(\pi V/2V_\pi)$, where V and $V_\pi$ are an applied modulating signal and the half-wave voltage of the modulator respectively. The same dependence governs amplitude-modulated secondary radiation modes, such as those generated in the bends of recombination branch 120 as well as those generated at the interface between the output waveguide and fiber. In contrast, the power of primary radiation mode 152 is proportional to $\sin^2(\pi V/2V_\pi)$. Thus, combined radiation field 158, sampled across one field lobe, can be expressed as:

$$E_{rad}(x,y) = E_{pr}(x,y) \cdot \sin(\pi V/2V_\pi) + E_{sec}(x,y) \cdot \cos(\pi V/2V_\pi) \cdot e^{j\phi} \quad (1)$$

where the coordinate system (x,y) is defined by the photodetector surface; $E_{pr}(x,y)$ and $E_{sec}(x,y)$ are the field distributions of the primary and secondary radiation mode, respectively; $\phi$ is the phase angle between the primary and secondary radiation fields.

The photodetector signal (photocurrent $I_{PD}$) can be determined by multiplying $E_{rad}(x,y)$ by its complex conjugate and integrating the product over the entire photodetector surface. Therefore, $I_{PD}$ can be expressed as:

$$I_{PD} = A[(1+\alpha)/2 + \sqrt{(1-\alpha)^2/4 + \alpha\cos^2\phi} \cdot \cos(\pi V/V_\pi + \Delta\Phi)] \quad (2)$$

where A is a constant of proportionality; $\alpha$ is the ratio of the secondary radiation mode power to that of primary radiation mode 152; and $\Delta\Phi$ is given by:

$$\Delta\Phi = \tan^{-1}(2\sqrt{\alpha} \cdot \cos\phi/(1-\alpha)). \quad (3)$$

Equations (2) and (3) show that combined radiation field 158 produces a photodetector signal that is shifted by $\Delta\Phi$ with respect to the signal that would be caused by primary radiation mode 152 alone (in the absence of secondary radiation waves). This signal from combined radiation field 158 is not complementary to that produced by guided mode 150, as illustrated in FIG. 3. Equation (3) shows that $\Delta\Phi$ is determined by the relative power $\alpha$ of the secondary radiation mode as well as the relative phase $\phi$ between the primary and secondary radiation modes. The relative phase $\Phi$ is determined by the effective differential optical path between the two waves and, as such, is dependent on wavelength and temperature.

Under some conditions, that is when $\phi = (2m-1)\pi/2$ and m is an integer, it follows from Equation (3) that $\cos\phi = 0$. In this case $\Delta\Phi = 0$, and the presence of secondary radiation modes affects only the magnitude but not the phase of the signal from combined radiation field 158. Thus, the signal from sampled combined radiation field 158 may happen to be complementary to the power of guided mode 150 for specific pairs of wavelength and temperature values.

However, in general the two outputs are not complementary, and the signal from combined radiation field 158 cannot be used for accurate bias control. The accuracy is worst when $\cos\phi = \pm 1$, that is when $\phi = \pi m$. In general, $|\cos\phi|$ is a variable that is randomly distributed between 0 and 1. Therefore, an average value of 0.5 ($\phi = 45°$) may be used to evaluate the dependence of $\Delta\Phi$ on the relative power $\alpha$, as is plotted in FIG. 4.

Figure 4:
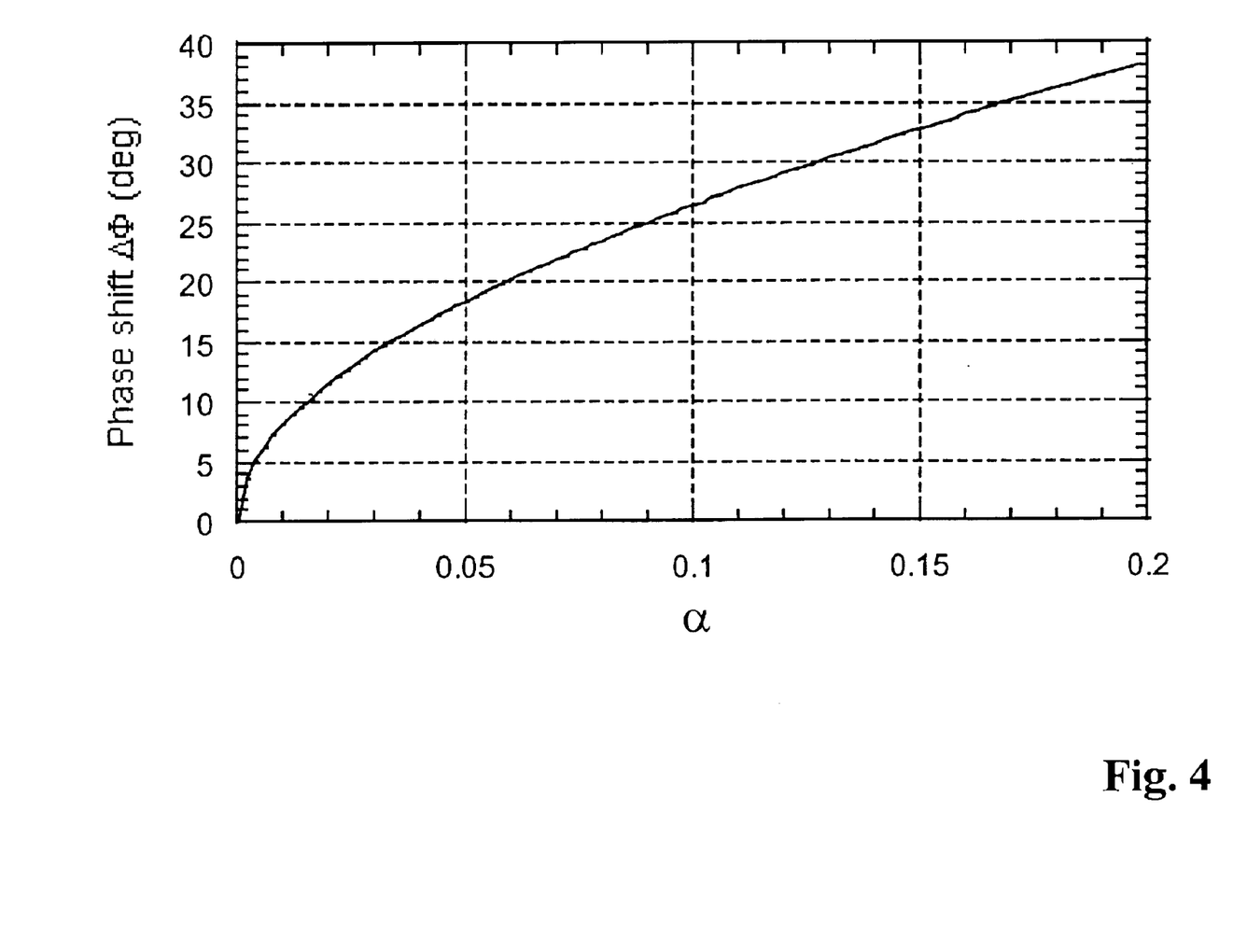
FIG. 4 shows a graph of phase shift between the modulation responses of the guided mode and radiation modes of an exemplary, practical MZI modulator.

FIG. 4 shows that even a small fraction of secondary radiation mode power can significantly affect the phase of the combined radiation field's modulation response. For example, even if the total of all secondary radiation mode powers is only 1% of the primary radiation mode power, then the modulation response of combined radiation field 158 can be altered in phase by as much as 8 degrees with respect to that of the guided mode 150. A phase difference of this magnitude is prohibitively high for most practical applications. Moreover, $\alpha$ may commonly be 1% or much more. For example, the output waveguide/fiber interface alone can create a 10% to 20% contribution to the secondary radiation mode power.

It is desirable to monitor the modulation bias point of an optical modulator 100 without tapping the guided mode 150. However, in practical modulators 100, secondary radiation waves may combine with the primary radiation mode 152 to destroy complementarity between the combined radiation field 158 and the guided mode 150. Thus, there is a need for a method or device that taps light from the combined radiation field 158 so as to form a monitor signal that is complementary to the optical power in the guided mode 150. Furthermore, although monitoring the output power of a Mach-Zehnder modulator 100 for controlling modulator bias is described above, those skilled in the art will recognize that the use of various optical modulators may benefit from monitoring power in a guided mode without tapping the guided mode signal. Accordingly, the present invention is not limited in application to Mach-Zehnder modulators or to bias control but is generally applicable to monitoring the output of modulators that distribute light between a guided output mode and a radiation mode.

SUMMARY OF THE INVENTION

The present invention provides a method and device for tapping light from the radiation modes of an optical modulator for monitoring the optical power in a guided output mode without tapping light from the guided mode. The invention allows monitoring the guided mode power, even when optical power in the radiation modes, as a function of differential phase, is not complementary to that of the guided mode. The device and method include incoherently adding photocurrents from separate portions of light from the radiation modes to form a monitor signal.

The foregoing general description and the following detailed description are merely exemplary and explanatory and are not restrictive of the invention as claimed.

BRIEF DESCRIPTION OF THE DRAWINGS

The accompanying drawings, which are incorporated in and constitute a part of this specification, illustrate exemplary embodiments of the invention and, together with the description, serve to explain the principles of the invention. In the drawings.

In the drawings, where the different embodiments have similar structures, the same reference numbers are usually used.

DETAILED DESCRIPTION OF THE INVENTION

Reference will now be made in detail to the present exemplary embodiments of the invention illustrated in the accompanying drawings. Whenever possible, the same reference numbers will be used throughout the drawings to refer to the same or like parts.

Although the present invention is suitable for a wide scope of applications, it is particularly suitable for tapping monitor light for controlling the bias of an optical modulator. The present invention includes a method and device for tapping light from optical radiation modes for monitoring the optical power in an optical guided mode without tapping light from the guided mode.

Figure 5A:
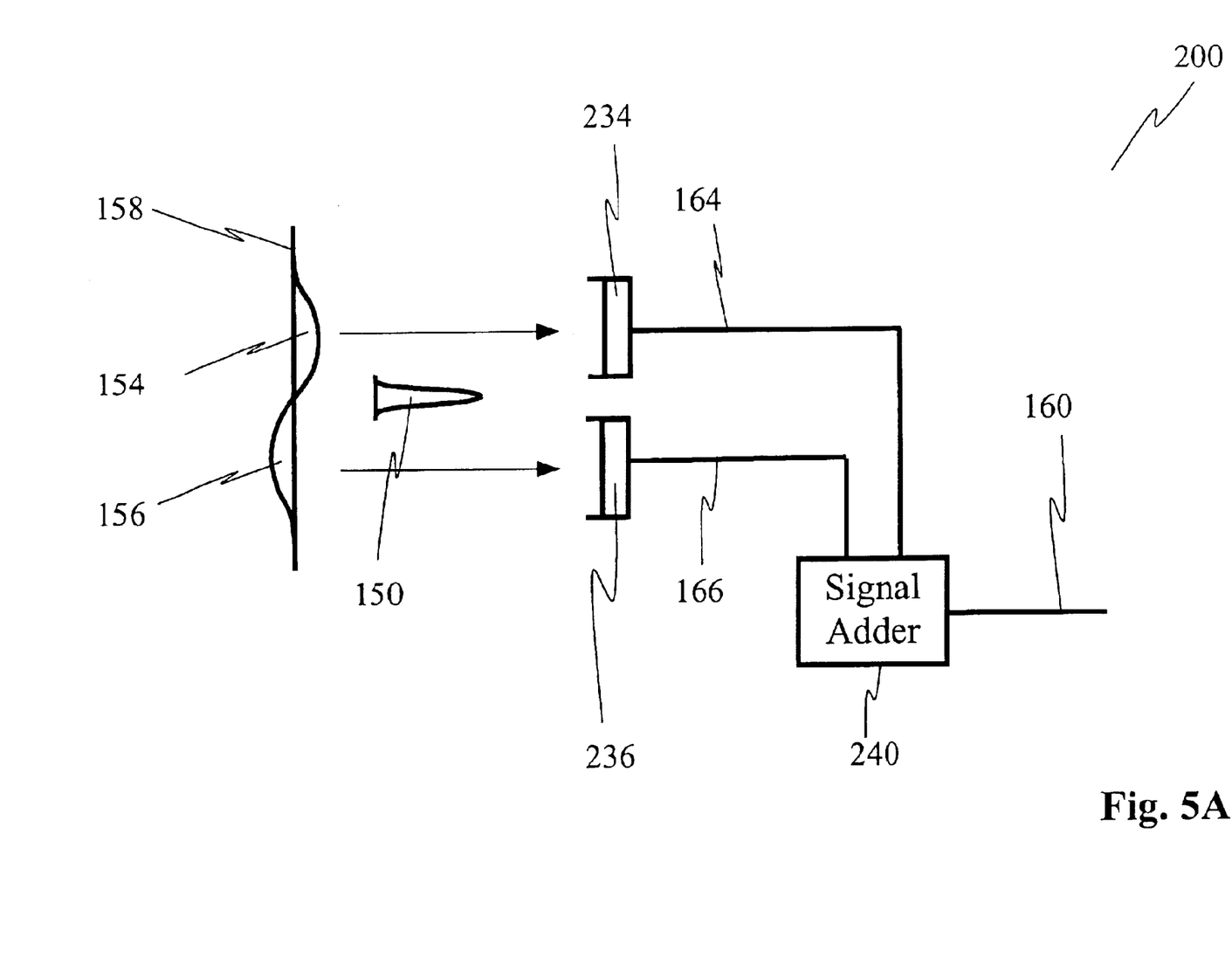
FIG. 5A schematically illustrates an exemplary method of forming a monitor signal that is a measure of the optical power in a guided output mode of an optical modulator, in accordance with the present invention.
Figure 5B:
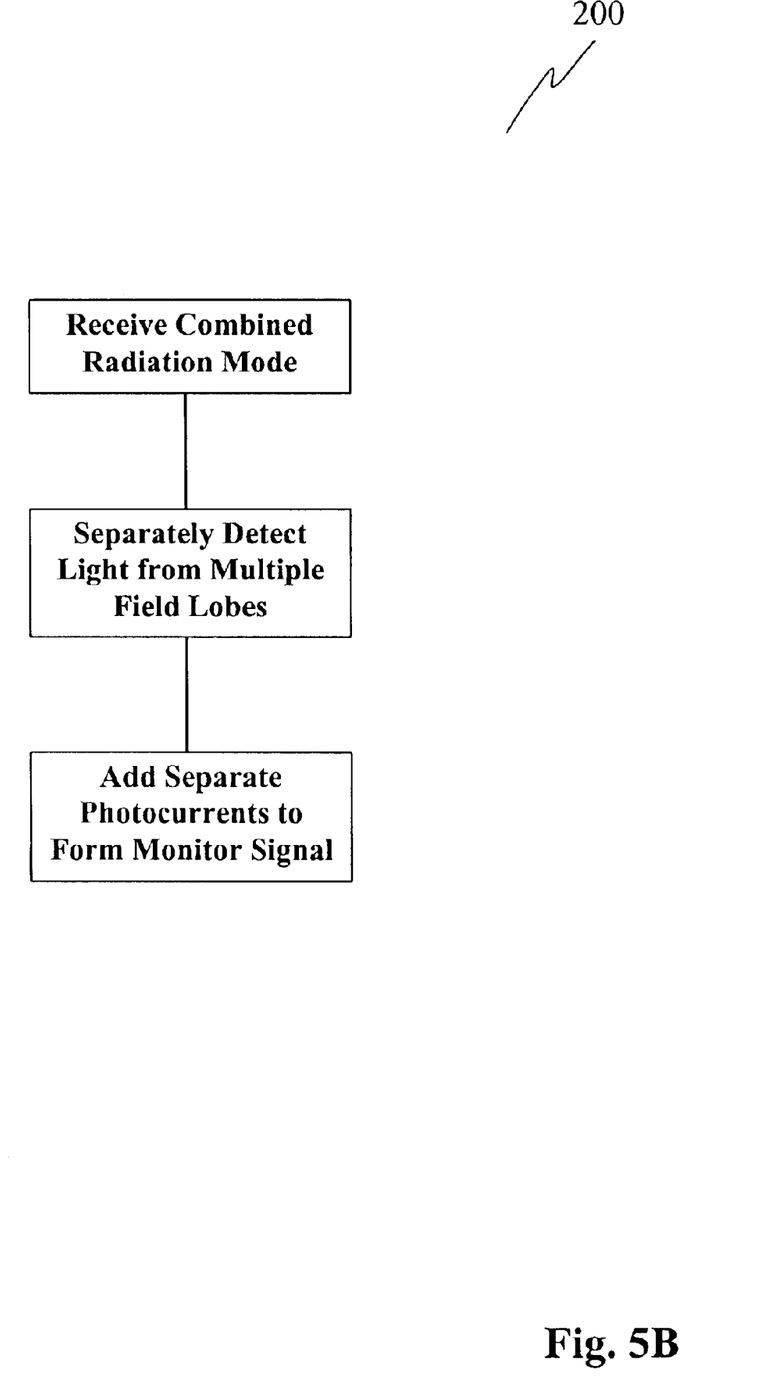
FIG. 5B is a flowchart that schematically illustrates the exemplary method illustrated in FIG. 5A.

FIGS. 5A and 5B schematically illustrate an exemplary method 200 for tapping light from combined radiation mode 158 and forming therefrom a monitor signal 160 that is complementary to the power of guided mode 150, according to the present invention. Method 200 includes receiving combined radiation mode 158 that has two field-profile lobes 154 and 156. Field lobes 154 and 156 include secondary radiation modes as well as the two field lobes of primary radiation mode 152 that are 180 degrees out of phase. Therefore, in field lobe 154, the phase difference between the primary and secondary radiation modes is φ; and in field lobe 156, the phase difference is φ+180°.

Method 200 includes electronically detecting light from field lobes 154 and 156 and forming individual lobe photocurrents 164 and 166 respectively, such as by using photodetectors 234 and 236. Equations (2) and (3) may be applied to show that lobe photocurrents 164 and 166, with phase shifts $\Delta\Phi_1$ and $\Delta\Phi_2$, are respectively equal to:

$$I_{PD1} = A[(1+\alpha)/2 + \sqrt{(1-\alpha)^2/4 + \alpha\cos^2\phi} \cdot \cos(\pi V/V_{90} + \Delta\Phi_1)] \quad (4a)$$

$$I_{PD2} = A[(1+\alpha)/2 + \sqrt{(1-\alpha)^2/4 + \alpha\cos^2\phi} \cdot \cos(\pi V/V_\pi + \Delta\Phi_2)] \quad (4b)$$

$$= A[(1+\alpha)/2 + \sqrt{(1-\alpha)^2/4 + \alpha\cos^2\phi} \cdot \cos(\pi V/V_\pi - \Delta\Phi_1)],$$

where $$\Delta\Phi_2 = -\Delta\Phi_1. \quad (4c)$$

Method 200 includes adding lobe photocurrents 164 and 166, such as by using a signal adder 240, to produce a monitor signal 160 that is equal to:

$$I_{PD\Sigma} = I_{PD1} + I_{PD2} \quad (5)$$

$$= A[1 + \alpha + 2\sqrt{(1-\alpha)^2/4 + \alpha\cos^2\phi} \cdot \cos(\pi V/V_\pi) \cdot \cos(\Delta\Phi_1)].$$

As seen from Equation (5), monitor signal 160 is complementary in phase to guided mode 150. If $\Delta\Phi_1$ changes due to a variation in wavelength or temperature, only the magnitude of the second term in Equation (5) changes, while its phase remains unaffected. Thus, the phase of monitor signal 160 is unaffected by the presence of amplitude-modulated secondary radiation modes. When cosφ≠0, lobe photocurrents 164 and 166 are each shifted in phase by equal amounts and in opposite directions, relative to a photocurrent that would be produced by the guided mode 150. However, monitor signal 160 is not shifted, irrespective of how lobe photocurrents 164 and 166 shift, such as with wavelength or temperature. Thus, method 200 provides monitor signal 160 that accurately represents the optical power in guided mode 150, without reducing the power of guided mode 150.

Monitoring an output mode, such as guided mode 150, may be useful in controlling the bias of an optical modulator, such as a Mach-Zehnder type modulator. However, those skilled in the art will recognize that monitoring the guided output of a modulator without reducing the output power, in accordance with the present invention, may be useful in a variety of applications.

Those skilled in the art will also recognize that, within the scope of the present invention, monitor signal 160 may be formed through any means so long as monitor signal 160 represents the incoherent sum of the individual optical intensities of field lobes 154 and 156. As an alternative step in method 200 described above, field lobes 154 and 156 may both be reflected onto a single photodetector that receives field lobes 154 and 156 on separate spots and directly generates a photocurrent that represents monitor signal 160 as described in Equation (5).

As a further alternative, photodetectors 234 and 236 need not detect the entirety of field lobes 154 and 156 respectively. Photodetector 234 may sample any portion of field lobe 154, and photodetector 236 may sample any portion of field lobe 156, wherein the portions need not be equal in area or optical power. However, this alternative requires the further step of individually adjusting the magnitudes of photocurrents 164 and 166 before summing to generate monitor signal 160.

Figure 6A:
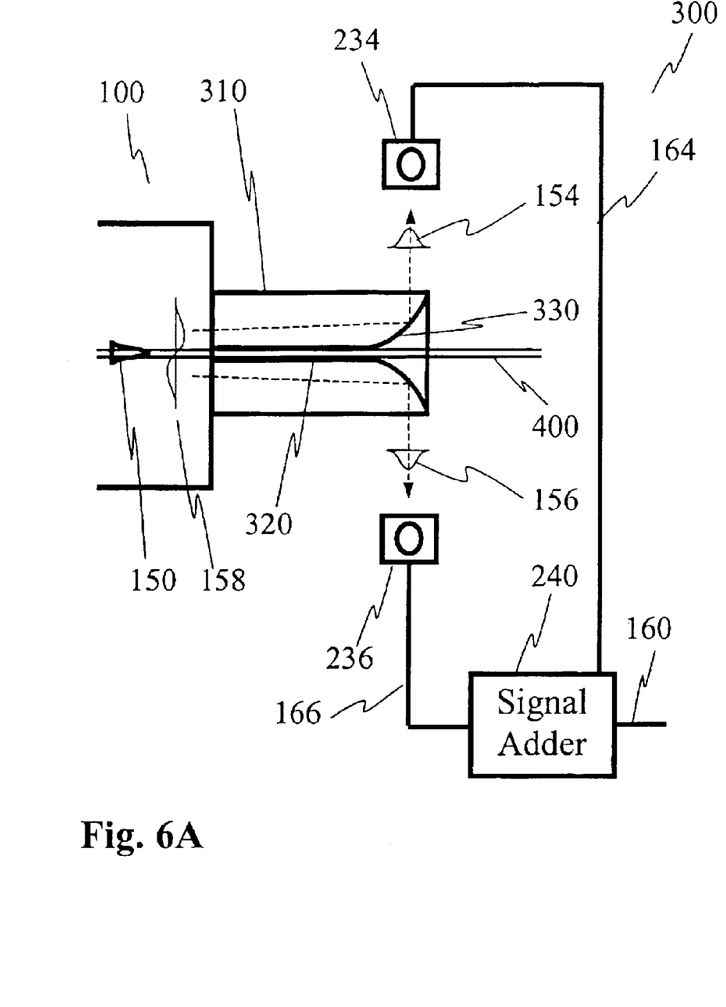
FIG. 6A schematically illustrates an exemplary optical tap for forming a monitor signal that is a measure of the optical power in a guided output mode of an optical modulator, in accordance with the present invention.
Figure 6B:
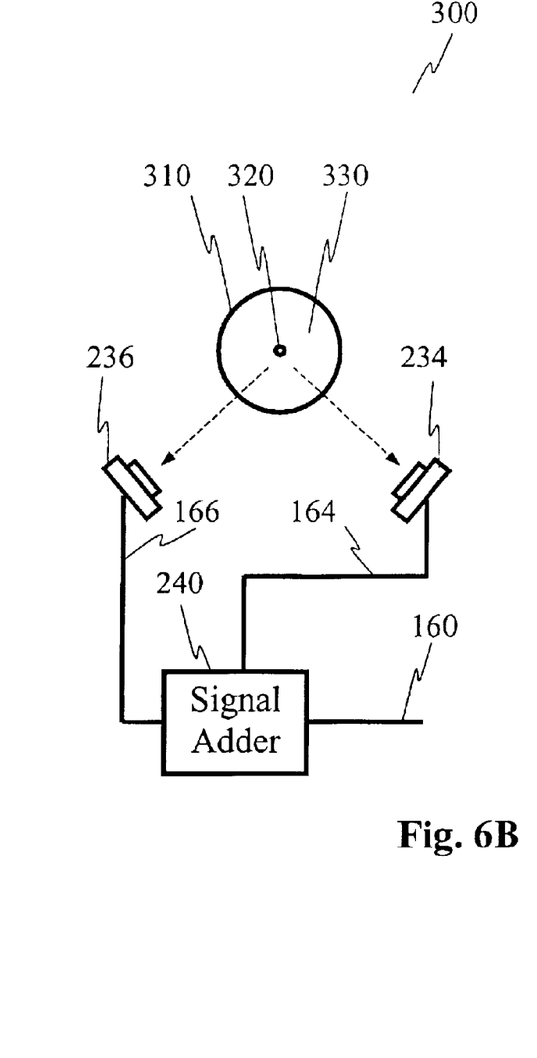
FIG. 6B schematically illustrates an end view of the exemplary optical tap of FIG. 6A.

FIGS. 6A and 6B schematically illustrate an exemplary optical tap 300 for tapping light from combined radiation mode 158 and forming therefrom a monitor signal 160 that is complementary to the power of guided mode 150, according to the present invention. FIG. 6A also schematically illustrates part of an optical modulator 100, similar to that shown in FIG. 1, as well as guided mode 150 and combined radiation mode 158, like those shown in FIG. 5. Optical tap 300 includes a capillary 310 that has a front face, a back face, a center-bore 320 through its length, and a conical or chamfered lead-in 330 on the center-bore at the back face. Capillary 310 may be made of any material that is transparent to the wavelength of light in combined radiation mode 158, such as glass, plastic, lithium niobate, or semiconductor. Lead-in 330 may be produced through any convenient method, such as through micro-machining or chemical etching.

Capillary 310 is coupled to receive light from modulator 100, with guided mode 150 propagating from the front face, down center-bore 320 to the back face. As an alternative, an optical fiber 400 may be fed through lead-in 330 and center-bore 320 to the front face of capillary 300, where it is coupled to receive guided mode 150, as shown. Optical fiber 400 may be secured to center-bore 320 and/or to an exit face of modulator 100 that provides guided mode 150. Additionally, capillary 310 may contain an index-matching material between the exit face of modulator 100 and an entrance face of optical fiber 400.

Capillary 310 is also coupled to receive combined radiation mode 158 for propagation through the walls of capillary 310 to lead-in 330. Lead-in 330 is shaped to reflect field lobes 154 and 156 to separate locations outside of capillary 310. Lead-in 330 may have any convenient shape. For example, lead-in 330 may be circularly symmetric and centered on center-bore 320. This example and other examples have the advantage that capillary 310 need not be located with any specific orientation around the axis of center-bore 320, which can simplify manufacturing. Lead-in 330 may be configured to reflect field lobes 154 and 156 through any convenient method, such as partial reflection at the lead-in/air boundary, total internal reflection at the boundary, or reflection by a reflective coating at the boundary. As a further example, lead-in 330 may be shaped to reflect field lobes 154 and 156 to destination spots with positive or negative focusing. Alternatively, lead-in 330 may be shaped to steer field lobes 154 and 156 to any convenient, separate locations.

Optical tap 300 includes photodetectors 234 and 236, which receive field lobes 154 and 156, and produce lobe photocurrents 164 and 166, respectively. Photodetectors 234 and 236 may be of any type convenient for detecting light from field lobes 154 and 156, such as InGaAs-based or other semiconductor-based photodetectors. Optical tap 300 also includes signal adder 240 that sums lobe photocurrents 164 and 166 to produce monitor signal 160. Signal adder 240 may be simply an electrical connection, such as a wire joint, or signal adder 240 may be any circuitry that adds electrical signals, such as an operational amplifier-based analog adder circuit. Photodetectors 234 and 236 may be placed at any location convenient to receiving field lobes 154 and 156, such as being placed within the same package with optical tap 300 or being secured to the outside of capillary 310.

Figure 7A:
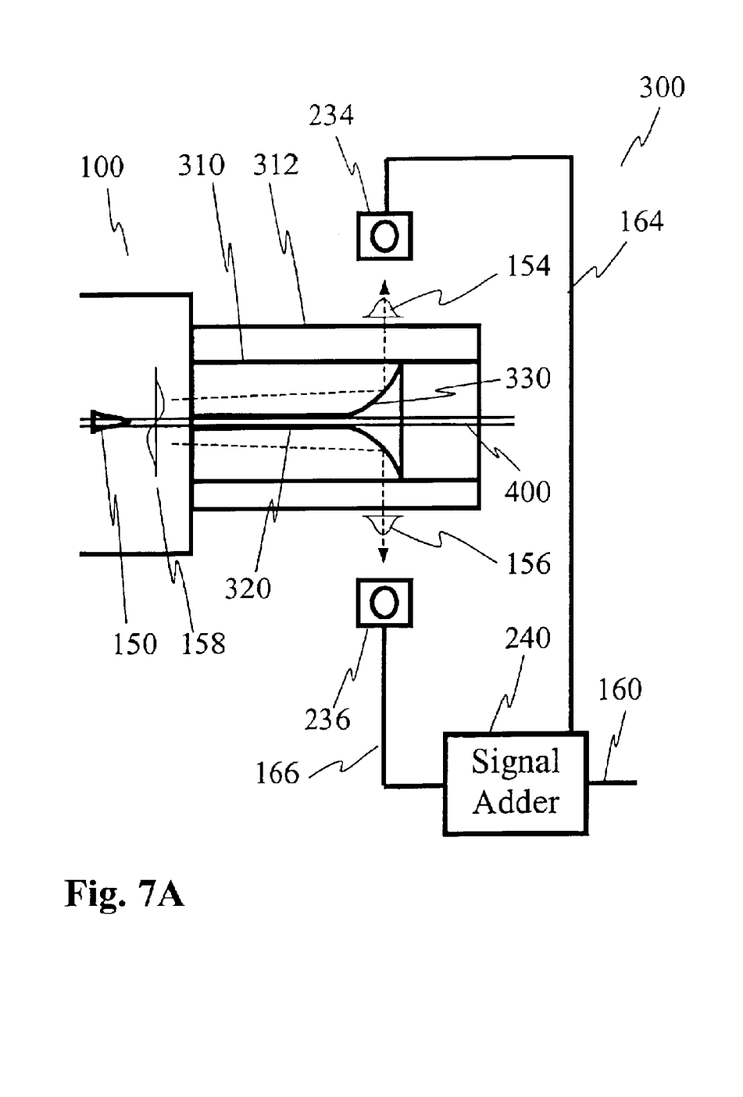
FIG. 7A schematically illustrates an alternative optical tap for forming a monitor signal that is a measure of the optical power in a guided output mode of an optical modulator, in accordance with the present invention.
Figure 7B:
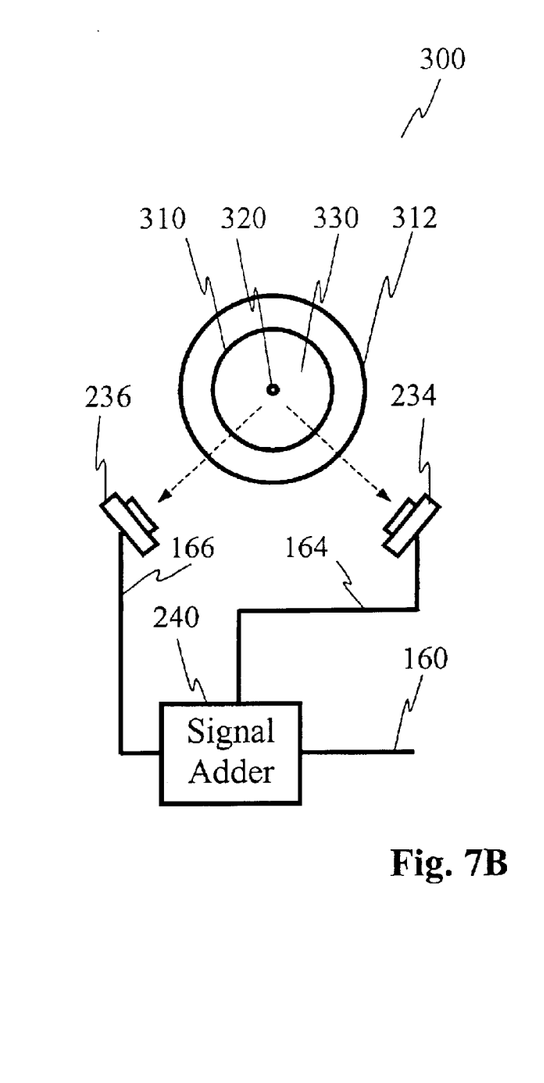
FIG. 7B schematically illustrates an end view of the alternative optical tap of FIG. 7A.

FIGS. 7A and 7B schematically illustrate an alternative exemplary optical tap 300 for forming monitor signal 160, according to the present invention. In this example, optical tap 300 is like that of FIGS. 6A and 6B, except that capillary 310 is placed within an outer tube 312, which may be secured to capillary 310 and/or optical modulator 100. Like capillary 310, outer tube 312 may be made of any material that is transparent to the wavelength of light in combined radiation mode 158, such as glass, or plastic. Lead-in 330 is shaped so as to reflect field lobes 154 and 156 to photodetectors 234 and 236 outside of outer tube 312. Lead-in 330 may also be shaped so as to counter the focusing that field lobes 154 and 156 receive in passing through the wall of outer tube 312.

Figure 8A:
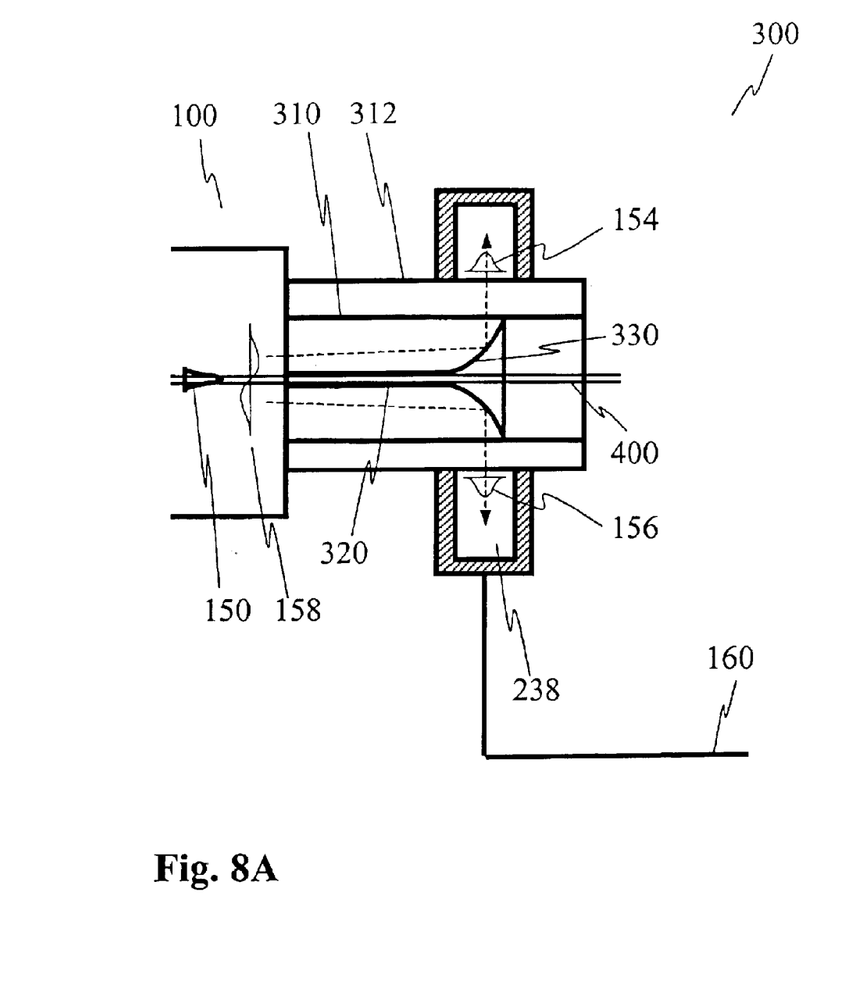
FIG. 8A schematically illustrates a further alternative optical tap for forming a monitor signal that is a measure of the optical power in a guided output mode of an optical modulator, in accordance with the present invention.
Figure 8B:
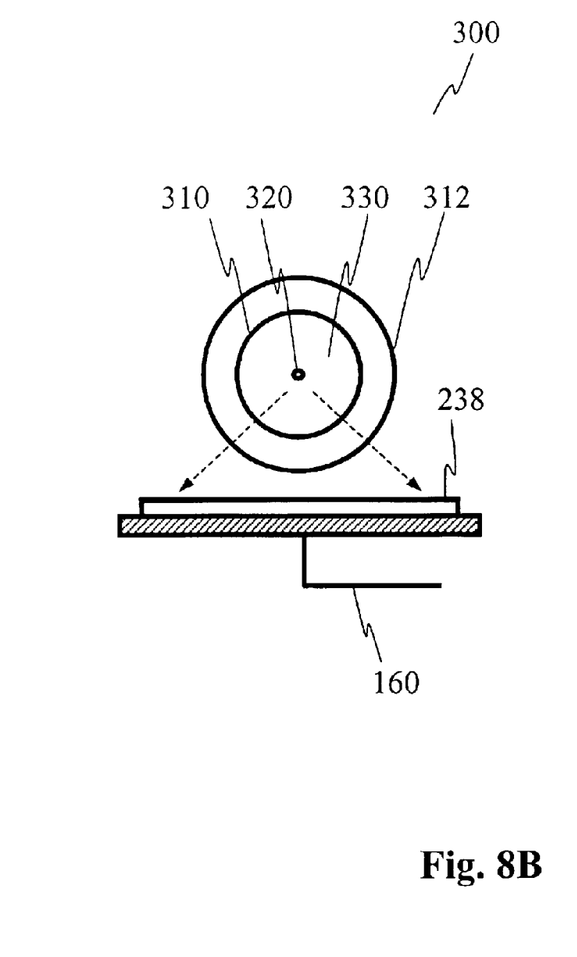
FIG. 8B schematically illustrates an end view of the further alternative optical tap of FIG. 8A.

FIGS. 8A and 8B schematically illustrate a further alternative exemplary optical tap 300 for forming monitor signal 160, according to the present invention. In this example, optical tap 300 is like that in FIGS. 6A and 6B or 7A and 7B, except that lead-in 330 reflects field lobes 154 and 156 to two separate spots on a single photodetector 238. Photodetector 238 directly creates monitor signal 160 that is a measure of the incoherent sum of optical field lobes 154 and 156.

Figure 9:
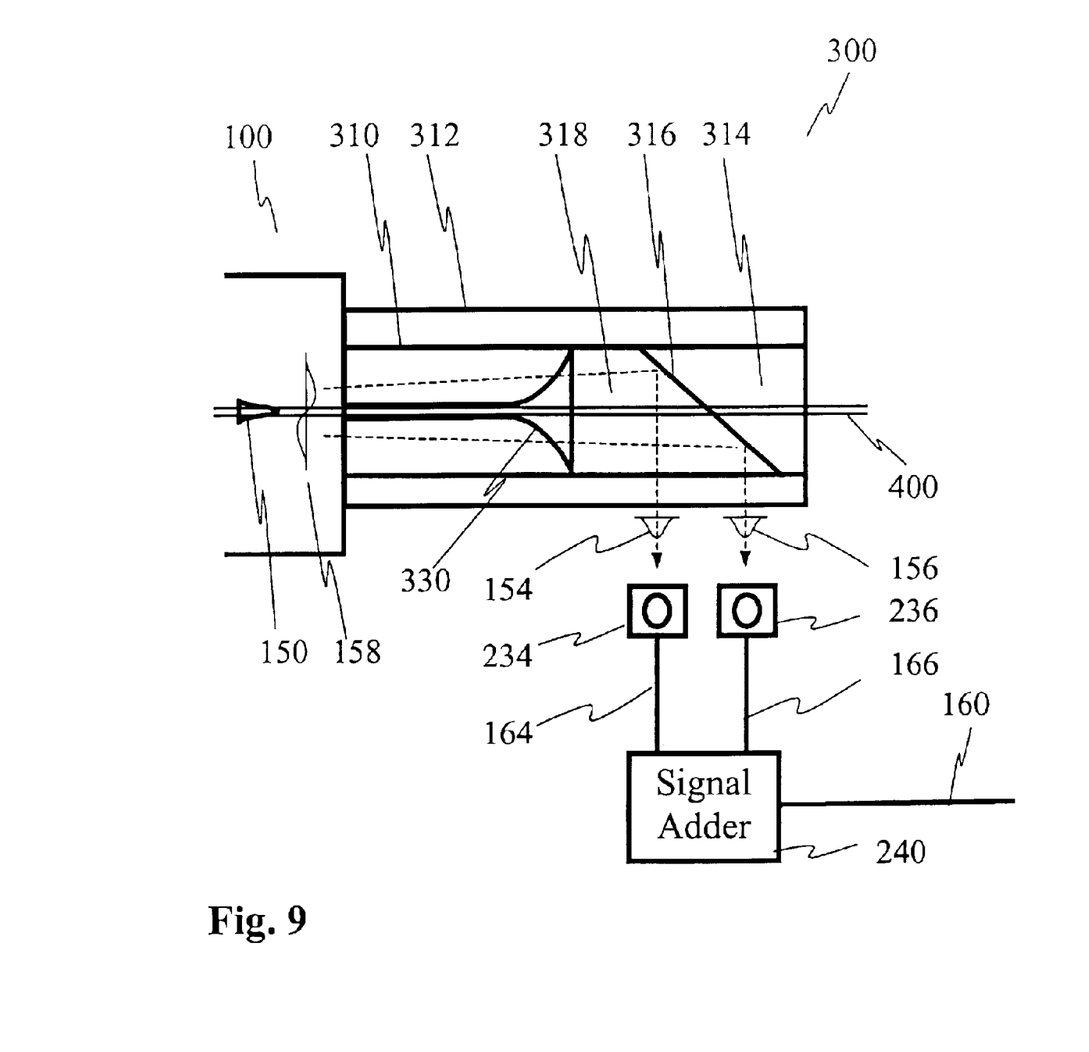
FIG. 9 schematically illustrates an additional alternative optical tap for forming a monitor signal that is a measure of the optical power in a guided output mode of an optical modulator, in accordance with the present invention.

FIG. 9 schematically illustrates a further alternative exemplary optical tap 300 for forming monitor signal 160, according to the present invention. In this example, optical tap 300 is like that in FIGS. 7A and 7B, except that a reflector 314 is also placed inside outer tube 312 so that field lobes 154 and 156 may propagate past lead-in 330 to a reflective surface 316 of reflector 314. Reflector 314 may include a center bore that accommodates optical fiber 400. In this case, lead-in 330 may have any shape convenient to passing field lobes 154 and 156, such as a flat face with no increase of bore diameter. Lead-in 330 may include an anti-reflective layer that facilitates passage of field lobes 154 and 156. Outer tube 312 may include an index matching material 318 between lead-in 330 and reflector 314 that reduces reflection of field lobes 154 and 156 at lead-in 330.

In this example, reflector 314 reflects field lobes 154 and 156 to separate spots that are received by photodetectors 234 and 236, respectively. Photodetectors 234 and 236 generate photocurrents 164 and 166 respectively, which are added by signal adder 240 to create monitor signal 160. Reflector 314 may be of any material useful for reflecting light. For example, reflector 314, with the center-bore, may be constructed from the same capillary material used to construct capillary 310. Reflective surface 316 may be any surface that reflects the wavelength and incidence angles of field lobes 154 and 156, such as a thin-film reflective surface. Reflective surface 316 may be of any shape required to reflect field lobes 154 and 156 to any convenient, separate locations, with or without positive or negative focusing.

Those skilled in the art will appreciate that various modifications can be made in the present invention without departing from the spirit or scope of the invention. Thus, it is intended that the present invention cover the modifications and variations of this invention provided they come within the scope of the appended claims and their equivalents.

We claim:

1. A method of forming a monitor signal that is a measure of optical output power from an optical modulator, the method comprising the steps of:

providing an optical modulator that distributes light between a guided mode output and radiation modes;

detecting multiple separate portions of the light from the radiation modes to form multiple photocurrents; and     summing the photocurrents to form a monitor signal; wherein the total photocurrent is a measure of the incoherent sum of the separate portions of light.

2. The method of claim 1, wherein the light from the radiation modes is formed into at least two lobes that are separately detected.

3. The method of claim 1, wherein the optical modulator is a Mach-Zehnder type modulator.

4. The method of claim 1, wherein the steps of forming multiple photocurrents and summing the photocurrents are done in the same photodetector.

5. The method of claim 1, further comprising the step of adjusting the magnitude of each photocurrent before summing them.

6. An optical tap for forming a monitor signal that is a measure of optical output power from an optical modulator, comprising:

a capillary that has a front face, a back face, a cylindrical wall and a center-bore through its length between the faces, wherein the cylindrical wall is coupled to receive light from radiation modes of an optical modulator;

a lead-in on the back face of the capillary, wherein the lead-in is shaped to reflect multiple separate portions of the radiation mode light to the outside of the capillary;

multiple photodetectors, wherein each photodetector is coupled to receive one of the separate portions of the radiation mode light and is configured to form a photocurrent therefrom; and a signal adder that is coupled to receive the photocurrents and configured to add them to form a monitor signal.

7. The optical tap of claim 6, further comprising an outer tube, wherein the capillary is placed inside the outer tube, and wherein the portions of the radiation mode light are reflected through the wall of the outer tube to the photodetectors.

8. The optical tap of claim 7, wherein the capillary and the outer tube comprise material that is transparent at the wavelength of the radiation mode light.

9. The optical tap of claim 8, further comprising an optical fiber that is inserted through the center-bore of the capillary, wherein the fiber is coupled to receive the light from a guided output mode of the optical modulator.

10. The optical tap of claim 9, wherein the optical modulator is a Mach-Zehnder type modulator.

11. The optical tap of claim 10, wherein the lead-in is shaped so as to reflect the separate portions of radiation mode light through total internal reflection.

12. The optical tap of claim 10, wherein the lead-in further includes a reflective coating for reflecting the separate portions of radiation mode light.

13. The optical tap of claim 10, wherein the lead-in is shaped so as to reflect the separate portions of radiation mode light with positive or negative focusing.

14. An optical tap for forming a monitor signal that is a measure of optical output power from an optical modulator, comprising:

a capillary that has a front face, a back face, a cylindrical wall and a center-bore through its length between the faces, wherein the cylindrical wall is coupled to receive light from radiation modes of an optical modulator, a lead-in on the back face of the capillary, wherein the lead-in is shaped to reflect multiple separate portions of the radiation mode light to the outside of the capillary;

a photodetector with a receiving surface that is coupled to receive the separate portions of radiation mode light, wherein the separate portions do not overlap on the receiving surface, and wherein the photodetector is configured to form a monitor signal from the total photocurrent from the separate portions.

15. The optical tap of claim 14, further comprising an outer tube, wherein the capillary is placed inside the outer tube, and wherein the portions of the radiation mode light are reflected through the wall of the outer tube to the photodetector.

16. The optical tap of claim 15, wherein the capillary and the outer tube comprise material that is transparent at the wavelength of the radiation mode light.

17. The optical tap of claim 16, further comprising an optical fiber that is inserted through the center-bore of the capillary, wherein the fiber is coupled to receive the light from a guided output mode of the optical modulator.

18. The optical tap of claim 17, wherein the optical modulator is a Mach-Zehnder type modulator.

19. The optical tap of claim 18, wherein the lead-in is shaped so as to reflect the separate portions of radiation mode light through total internal reflection.

20. The optical tap of claim 18, wherein the lead-in further includes a reflective coating for reflecting the separate portions of radiation mode light.

21. The optical tap of claim 18, wherein the lead-in is shaped so as to reflect the separate portions of radiation mode light with positive or negative focusing.

22. An optical tap for forming a monitor signal that is a measure of optical output power from an optical modulator, comprising:

an outer tube;

a capillary that is placed inside the outer tube and has a front face, a back face, a cylindrical wall and a center-bore through its length between the faces, wherein the cylindrical wall is coupled to receive light from radiation modes of an optical modulator;

a reflector with a front face, a back face, a reflective surface, and a center-bore through its length, wherein the reflector is placed inside the outer tube behind the capillary and coupled to receive the radiation mode light from the capillary, and wherein the reflector is shaped to reflect multiple separate portions of the radiation mode light through the wall of the outer tube;

multiple photodetectors, wherein each photodetector is coupled to receive one of the separate portions of the radiation mode light and is configured to form a photocurrent therefrom; and a signal adder that is coupled to receive the photocurrents and configured to add them to form a monitor signal.

23. The optical tap of claim 22, wherein the capillary and the outer tube comprise material that is transparent to the wavelength of the radiation mode light.

24. The optical tap of claim 23, further comprising an optical fiber that is inserted through the center-bores of the capillary and the reflector, wherein the fiber is coupled to receive the light from a guided output mode of the optical modulator.

25. The optical tap of claim 24, wherein the optical modulator is a Mach-Zehnder type modulator.

26. The optical tap of claim 25, wherein the reflective surface further includes a reflective coating for reflecting the separate portions of radiation mode light.

27. The optical tap of claim 25, wherein the reflective surface is shaped so as to reflect the separate portions of radiation mode light with positive or negative focusing.

* * * * *